(12) United States Patent
Kato (10) Patent No.: US 10,409,131 B2
(45) Date of Patent: Sep. 10, 2019

(54) ELECTRO-OPTICAL APPARATUS, DISPLAY APPARATUS

(71) Applicant: STANLEY ELECTRIC CO., LTD., Meguro-ku, Tokyo (JP)

(72) Inventor: Keisuke Kato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/948,080

(22) Filed: Apr. 9, 2018

(65) Prior Publication Data
US 2018/0299739 A1   Oct. 18, 2018

(30) Foreign Application Priority Data

Apr. 17, 2017 (JP) .................................. 2017-081071

(51) Int. Cl.
*G02F 1/155* (2006.01)
*G02B 1/118* (2015.01)
*G02B 5/02* (2006.01)

(52) U.S. Cl.
CPC .............. *G02F 1/155* (2013.01); *G02B 1/118* (2013.01); *G02B 5/0221* (2013.01); *G02F 2001/1552* (2013.01)

(58) Field of Classification Search
None
See application file for complete search history.

(56) References Cited

U.S. PATENT DOCUMENTS

| 6,436,619 | B1* | 8/2002 | Majumdar | G03C 1/895 430/496 |
|---|---|---|---|---|
| 9,188,826 | B2 | 11/2015 | Kobayashi et al. | |
| 2007/0182706 | A1 | 8/2007 | Cassidy et al. | |
| 2011/0003121 | A1 | 1/2011 | Tsuda | |
| 2011/0189440 | A1* | 8/2011 | Appleby | B22C 9/04 428/156 |
| 2014/0218781 | A1 | 8/2014 | Kobayashi et al. | |
| 2016/0313769 | A1* | 10/2016 | Yoshitani | G04G 17/045 |

FOREIGN PATENT DOCUMENTS

WO    2012118188 A2    9/2012

OTHER PUBLICATIONS

Extended European Search Report (EESR) dated Aug. 21, 2018 issued in counterpart European Application No. 18167624.8.

* cited by examiner

*Primary Examiner* — Kenneth B Lee, Jr.
(74) *Attorney, Agent, or Firm* — Holtz, Holtz & Volek PC (57) ABSTRACT

To provide an electro-optical apparatus suitably usable as a reflective display apparatus with excellent visibility. A first substrate having a first electrode on one surface side, a second substrate having a second electrode on one surface side and arranged opposing the first substrate, an electrolyte layer having material used for electrolytic deposition and disposed between the first electrode and the second electrode are included. Each of the first electrode and the second electrode has a concave-convex configuration on one surface side that is in contact with the electrolyte layer. Surface roughness Ra of one side of the first electrode is 0.4 μm or more, and surface roughness Ra of one surface side of the second electrode is 0.02 μm or more and relatively smaller than the surface roughness of the first electrode.

10 Claims, 8 Drawing Sheets

ELECTRO-OPTICAL APPARATUS, DISPLAY APPARATUS

BACKGROUND OF THE INVENTION

Field of the Invention

The present invention relates to an electro-optical apparatus and the like configured using an electrochromic material.

Description of the Background Art

A prior art related to an electro-optical apparatus configured using an electrochromic material is disclosed in, for example, International Patent Publication WO 2012/118188 (hereinafter referred to as Patent Document 1). In the apparatus disclosed in Patent Document 1, an electrolyte layer is disposed between a pair of transparent substrates each having an electrode, fine irregularities are provided on the surface of the electrode of one transparent substrate, and the surface of the electrode of the other substrate is smooth. When a voltage is applied between the electrodes, silver ions in the electrolyte layer are reduced at one electrode and deposits a silver film. When the voltage application is canceled, the silver film is again dissolved as silver ions. At this time, when a silver film is deposited on the smooth surface electrode, the surface of the electrode becomes a mirror face state and reflects the incident light. Further, when a silver film is deposited on the surface of the electrode with fine irregularities, the incident light is irregularly reflected on the surface of the electrode, creating a black state in appearance. Further, when no voltage is applied between the electrodes, a transparent state is obtained.

Meanwhile, when considering using the apparatus disclosed in the above-stated Patent Document 1 as a reflective display apparatus, there is a disadvantage as follows. Consider, for example, a case where a display part is configured by patterning an electrode into a desired shape. In this case, if a silver film is deposited on the electrode having fine irregularities, then a black display can be achieved at the portion corresponding to this electrode, but since the periphery of this portion is in a transparent state (light transmission state), the contrast becomes low and shortcoming such as low visibility could likely occur.

To cope with this shortcoming, for example, by disposing a scattering plate behind one of the transparent substrate, it may be possible to scatter the light transmitted through the non-display portion and improve the contrast. However, in this case, since the scattering plate is always visible in the non-display state, a transparent state can not be obtained which is not desirable from the viewpoint of extending the application of the display apparatus.

Therefore, in a specific aspect, it is an object of the present invention to provide an electro-optical apparatus that can be suitably used as a reflective display apparatus with superior visibility.

SUMMARY OF THE INVENTION

An electro-optical apparatus according to one aspect of the present invention includes (a) a first substrate having a first electrode on one surface side, (b) a second substrate having a second electrode on one surface side and disposed facing the first substrate, (c) an electrolyte layer including material used for electrolytic deposition and disposed between the first electrode and the second electrode, (d) wherein each of the first electrode and the second electrode has irregularities on one surface side which is in contact with the electrolyte layer, (e) wherein roughness Ra of the one surface side of the first electrode is 0.4 μm or more, and (f) wherein roughness Ra of the one surface side of the second electrode is 0.02 μm or more and is a value relatively smaller than the surface roughness of the one surface side of the first electrode.

According to the above described configuration, it is possible to freely switch between the white state, the black state, and the transparent state by appropriately applying a voltage between the first electrode and the second electrode. Therefore, for example, in the case of using the electro-optical apparatus as a display apparatus, it is possible to achieve a new electro-optical apparatus which is superior in image visibility and is in a transparent state and does not hinder the field of view when not in use.

DESCRIPTION OF THE PREFERRED EMBODIMENTS

First Embodiment

Figure 1:
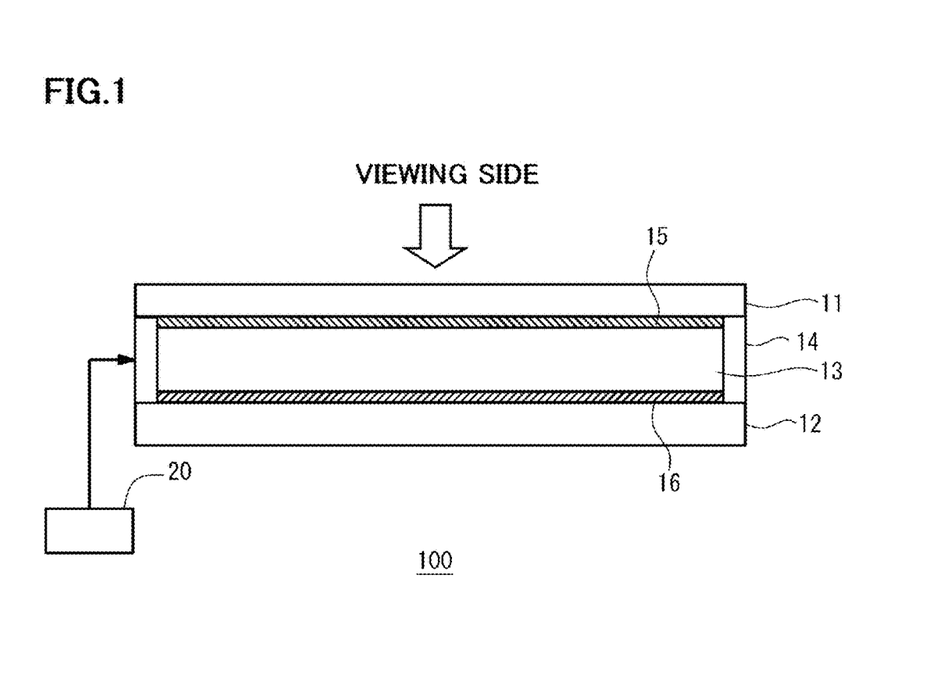
FIG. 1 is a schematic cross-sectional view showing the configuration of the electro-optical apparatus according to the first embodiment.

FIG. 1 is a schematic cross-sectional view showing the configuration of the electro-optical apparatus according to the first embodiment. The electro-optical apparatus 100 shown in FIG. 1 is used as a display apparatus, for example, and comprises a first substrate 11, a second substrate 12, an electrolyte layer 13, a seal member 14, and a driving device 20.

The first substrate 11 is, for example, a rigid substrate (for example, a glass substrate) having transparency. On one surface side of the first substrate 11, a first electrode 15 having fine irregularities (concave-convex configuration) is provided substantially over the entire surface thereof. Similarly, the second substrate 12 is, for example, a rigid substrate (for example, a glass substrate) having transparency. On one surface side of the second substrate 12, a second electrode 16 having fine irregularities is provided substantially over the entire surface thereof.

The first substrate 11 and the second substrate 12 are disposed such that one surface side of the first substrate 11 and the second substrate 12 face each other. And the electro-optical apparatus 100 of the present embodiment is arranged and used so as to be viewed by the user from the side of the first substrate 11. That is, the first substrate 11 is disposed on the viewing side.

The electrolyte layer 13 is formed using an electrolytic solution containing a material used for electrolytic deposition and is disposed between one surface side of the first substrate 11 and the second substrate 12. In detail, the electrolytic solution constituting the electrolyte layer 13 comprises an electrochromic material, a mediator, a supporting electrolyte, a solvent, a polymer as a gelling agent, and the like.

As an example of the material constituting the electrolyte layer 13, 350 mM (milli-molar concentration or milli-mol/l, the same shall apply hereinafter) of AgBr is used for the electrochromic material, 30 mM of $CuCl_2$ for the mediator, 700 mM of LiBr for the supporting electrolyte, and triglyme for the solvent.

Here, the silver compound is not limited to the above, and silver chloride, silver oxide, silver bromide, silver iodide, silver nitrate or the like may be used. The concentration of the silver compound is preferably, for example, 5 mM or more and 500 mM or less, but is not limited thereto.

The supporting electrolyte is not particularly limited as long as it promotes oxidation-reduction reaction and the like of the coloring material, and for example, lithium salts (LiCl, LiBr, LiI, $LiBF_4$, $LiClO_4$, etc.), potassium salts (KCl, KBr, KI, etc.), sodium salt (NaCl, NaBr, NaI, etc.) may be suitably used. The concentration of the supporting electrolyte is preferably, for example, 10 mM or more and 1 M or less, but is not limited thereto.

The solvent should be capable of stably retaining a color developing material or the like and is not particularly limited as long as it has a refractive index n which is close to or approximately equal to the constituent material of the first substrate 11 and the second substrate 12. The reason why it is desirable that the refractive index be about the same is to prevent reflection on the interface as much as possible when the electro-optical apparatus is in a transparent state, so as to enhance transparency. For example, assuming that each substrate is a alkali-free glass having a refractive index of 1.52, if the difference in refractive index between the solvent and the glass is ±0.15, then the interface reflection can be reduced to 1% or less, and if the refractive index difference is ±0.10, then the interface reflection can be reduced to 0.5% or less. As such a solvent, a polar solvent such as propylene carbonate, a non-polar organic solvent, an ionic liquid, an ion conductive polymer, a polymer electrolyte, or the like may be used. Specifically, triglyme (n=1.432), propylene carbonate (n=1.419), dimethyl sulfoxide (n=1.479), N,N-dimethylformamide (n=1.431), tetrahydrofuran (n=1.409), γ-butyrolactone (n=1.436) or the like may be used.

The sealing material 14 is provided so as to surround a region where the substrates are overlapped between one surface side of the first substrate 11 and the one surface side of the second substrate 12, and seals the electrolyte layer 13. As the sealing material 14, for example, a ultraviolet curing type sealing material, a ultraviolet curing and thermosetting type sealing material, or a thermosetting type sealing material may be used.

In the present embodiment, gap materials (for example, 50 μm in diameter) are added to the seal member 14, and a gap distance (cell thickness) between the first substrate 11 and the second substrate 12 is secured by these gap materials. In the case where the first substrate 11 and the second substrate 12 having a large surface area are being used, it is preferable to disperse the gap materials inside the substrate surface in order to reduce unevenness of the cell thickness.

The driving device 20 is connected to the first electrode 15 and the second electrode 16, and supplies the driving voltage to the electrolyte layer 13 via these electrodes.

Figure 2A:
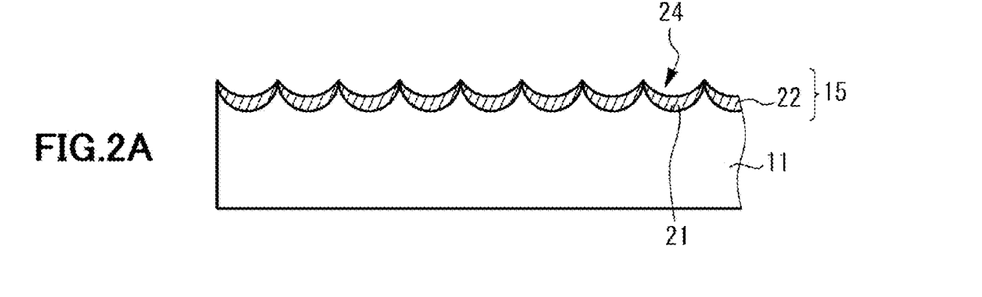
FIGS. 2A-2C are schematic cross-sectional views for explaining the configuration of the first electrode in detail.
Figure 2B:
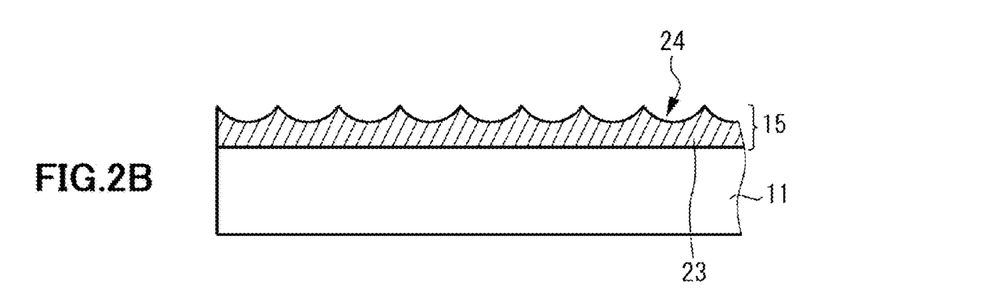

FIGS. 2A-2C are schematic cross-sectional views for explaining the configuration of the first electrode in detail. As the constitution of the first electrode 15, a few modes are conceivable. In the mode shown in FIG. 2A, the first electrode 15 includes a conductive film 22 provided along the surface of a large number of minute concave portion 21 formed on one surface side of the first substrate 11. As shown in the figure, the conductive film 22 is provided along the surface of the concave portion 21, and forms a concave-convex surface composed of a large number of concave portions 24 on one surface side of the first substrate 11. In the mode shown in FIG. 2B, the first electrode 15 has a conductive film 23 provided on one surface side of the first substrate 11, and the conductive film 23 forms a concave-convex surface composed of a large number of minute concave portions 24. According to any one of these modes, the first electrode 15 forming a fine concave-convex surface may be obtained.

Figure 2C:
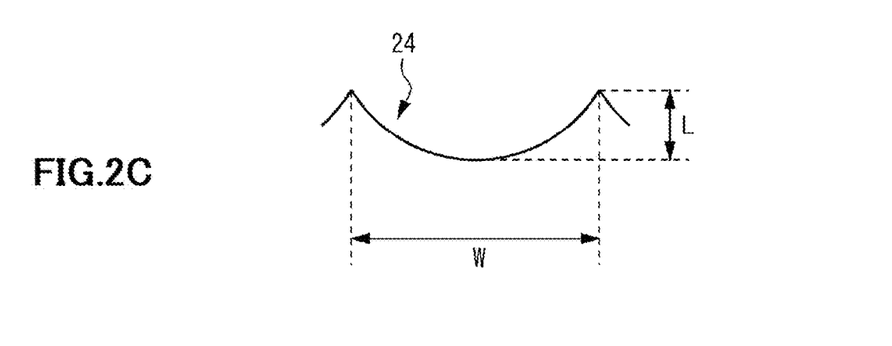

FIG. 2C is a schematic cross-sectional view for explaining the concave-convex configuration of the first electrode in detail. The concave-convex configuration on the surface of the conductive film 22 (or 23) of the first electrode 15 can be defined, for example, by the depth L and the width W of the concave portion 24 as shown in the figure. The depth L of the concave portion 24 is, for example, about several hundred nm (nano-meters), and the width W of the concave portion 24 is, for example, several μm (micro-meters). As a geometric model of the recess 24, a hemispherical shape as shown in the figure is considered, however, in reality, it is considered to be a random shape close to a hemispherical shape, and both its depth and width are not constant and may have variations within a certain range. The first electrode 15 in this embodiment preferably has a surface roughness of, for example, 0.4 μm or more and 0.8 μm or less. The surface roughness referred to here is, for example, the arithmetic average roughness Ra (the same applies hereinafter).

Figure 3:
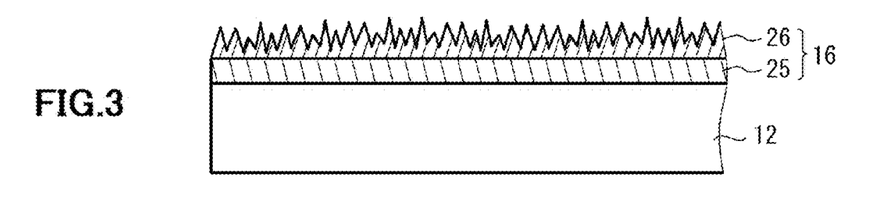
FIG. 3 is a schematic cross-sectional view for explaining the configuration of the second electrode in detail.

FIG. 3 is a schematic cross-sectional view for explaining the configuration of the second electrode in detail. The second electrode 16 in the illustrated embodiment comprises a substantially flat conductive film 25 provided on one surface side of the second substrate 12 and a conductive film 26 provided on the upper surface side of the conductive film 25, having a large number of fine irregularities on its surface. The conductive film 25 is a film such as an ITO film, for example. The conductive film 26 has a surface roughness of approximately one order of magnitude smaller than that of the conductive film 22 and the like of the first electrode 15, and is formed using metal nanoparticles such as ITO nanoparticles, for example. The surface roughness of the conductive film 26 is preferably, for example, 0.02 μm or more and 0.1 μm or less.

Although the second electrode 16 comprising the two layers of the conductive film 25 and the conductive film 26 is illustrated here, the configuration is not limited thereto. For example, after a conductive film is formed on one surface side of the second substrate 12, the surface of the conductive film may be appropriately treated by a physical method (blasting method or the like) or a chemical method (etching method or the like), and the second electrode 16 with nano-order surface roughness may be obtained.

Figure 4A:
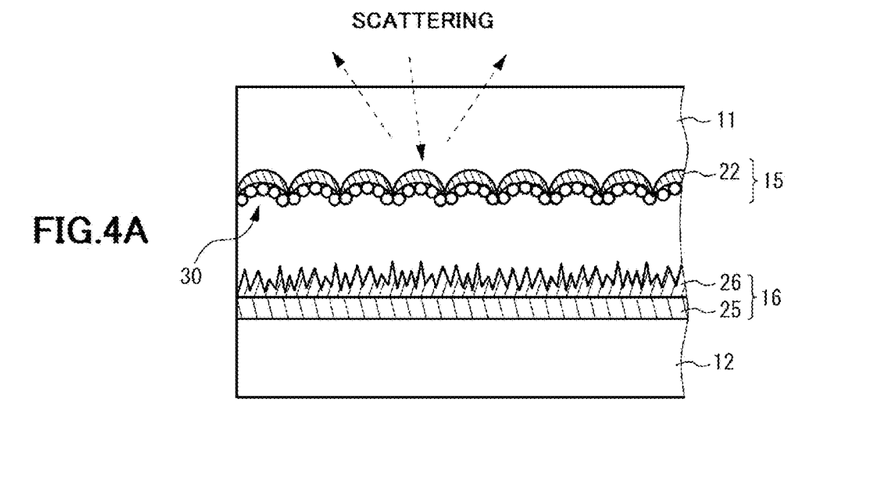
FIGS. 4A and 4B are schematic cross-sectional views for explaining the operation principle of the electro-optical apparatus.

FIGS. 4A and 4B are schematic cross-sectional views for explaining the operation principle of the electro-optical apparatus. By applying a DC voltage between the first electrode 15 and the second electrode 16 so that the first electrode 15 side has a relatively low potential, metal nuclei are generated and grow, and as shown in FIG. 4A, the metal film 30 is deposited on the concave portion of the first electrode 15. At this time, no metal film is deposited on the second electrode 16. The metal film 30 deposited on one surface side of the first electrode 15 becomes a dense film formed along the concave-convex configuration including each concave portion as shown in the figure. Here, if the size of the concave-convex configuration is equal to or larger than the wavelength of visible light (for example, 0.4 μm or more), then the incident light is scattered, and in appearance, a white state (bright state) is obtained.

Figure 4B:
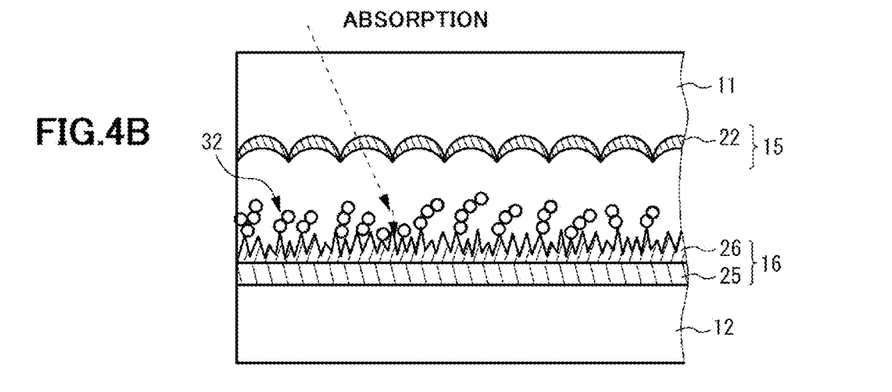

Further, by applying a DC voltage between the first electrode 15 and the second electrode 16 so that the second electrode 16 side is at a relatively low potential, metal nuclei are generated and grow, and as shown in FIG. 4B, the metal film 32 is deposited on the conductive film 26 of the second electrode 16. Here, since the electric field concentrates on the nano-order convex portions (projections), the supply of metal ions to the conductive film 26 becomes nonuniform, and the metal film 32 grows like a dendrite as shown in the figure. Thereby, a nano-order porous metal film 32 is formed. As described above, since the metal film 32 becomes a porous and intricate structure, the light incident on the metal film 32 repeats multiple reflection and is absorbed by the metal film 32. Therefore, most of the incident light does not return to the outside of the electro-optical apparatus, and in appearance, a black state (dark state) is obtained.

As described above, in the electro-optical apparatus 100 of the present embodiment, since each electrode is configured so that the surface roughness of the second electrode 16 is equal to or smaller than the surface roughness of the first electrode 15 by approximately one order of magnitude, the behavior of light incident on each electrode is different, and by utilizing this behavior difference, it is possible to switch between the white state and the black state. When no voltage is applied to each of the electrodes or when the electrodes are set to the same potential, deposition of the metal film does not occur. As a result, the electro-optical apparatus becomes transparent in appearance, in other words, incident light transmission state is obtained in the apparatus. That is, in the electro-optical apparatus 100 of this embodiment, three states, namely a white state, a black state, and a transparent state may be freely switched and used.

Next, a method of manufacturing the electro-optical apparatus of this embodiment will be described. Here, an example of a preferable production method of the apparatus where the first electrode 15 is constituted by providing a large number of minute concave portions on one side of the electrode and a conductive film being provided in these concave portions, and further, the second electrode 16 is constituted by using the metal nanoparticles will be described.

A blast treatment is applied, for example, to one surface of a transparent substrate such as an alkali-free glass substrate to form fine irregularities on one side of the transparent substrate. As a result, the first substrate 11 having a fine irregularities on one surface side is obtained. At this time, by appropriately setting various conditions of the blasting treatment, it is possible to control the roughness of the irregularities on the surface of the first substrate 11. When the blast treatment is performed, conditions such as the particle diameter of the shot (abrasive grain), the material of the shot, the projection pressure, the projection angle, the distance from the substrate when processing, the processing time and the like may be set as desired. It should be noted that a wet etching treatment or the like may be performed in place of the blast treatment. As for the conditions of the wet etching treatment, chemical composition, concentration, processing time, and the like may be set as desired.

Next, a conductive film is formed on the surface of the first substrate 11 having irregularities. For example, a transparent conductive film (ITO film) made of ITO (indium tin oxide) is formed by a sputtering method. As a result, the first electrode 15 is formed on one surface side of the first substrate 11. The sheet resistance of the ITO film is, for example, about 5 Ω/sq., and the film thickness is several hundred nm. The transparent conductive film is not particularly limited as long as it has a high optical transparency in the visible light region, and for example, a ZnO film, a $Ga_2O_5$ film, a graphene film, or the like may be used. Further, as to the method of forming a transparent conductive film, there are no limitations, and for example, various methods such as a vacuum evaporation method, an ion plating method, a spin coating method, etc. are conceivable (the same applies hereinafter).

On the other hand, a conductive film is formed on one surface of a transparent substrate such as an alkali-free glass substrate by a film forming method such as a sputtering method. For example, a transparent conductive film (ITO film) made of ITO (indium tin oxide) is formed by a sputtering method. As a result, the second electrode 16 having the conductive film 25 on one surface side is obtained. Note that a transparent substrate provided with a conductive film such as an ITO film or the like in advance may be used.

Next, a conductive film 26 having fine irregularities of a nano-meter order is formed by decorating the upper surface side of the conductive film 25 with metal nanoparticles. As the metal nanoparticles, for example, ITO nanoparticles may be used. The conductive film 26 may be formed, for example, by applying a paste containing ITO nanoparticles by screen printing or the like and then baking the applied film.

Next, a sealing material to which a gap material is added is applied to one substrate, for example, to one surface side of the first substrate 11. As the sealing material, various materials such as ultraviolet curing type, thermosetting type, mixed type of ultraviolet curing and thermosetting, and the like may be used.

Further, a gap material (for example, particle diameter of 100 μm) is scattered onto one surface side of the other second substrate 12. At this time, it is preferable from experience that the spraying amount of the gap material is 1-3 pieces per square millimeter, but it is not limited thereto. In place of the application of gap material, gap control may be performed by forming protrusions such as ribs on the substrate. In this case, preferably, the aspect ratio of the protrusion should be as high as possible.

Next, an electrolytic solution containing a material used for electrolytic deposition is sealed between the first substrate 11 and the second substrate 12. This step may be carried out by, for example, a vacuum injection method. Specifically, after the first substrate 11 and the second substrate 12 are bonded together in advance, an electrolytic solution is injected between the first substrate 11 and the second substrate 12 by a vacuum injection method. Note that this step can also be achieved by the use of one drop filling method (ODF method). Specifically, after an electrolytic solution is dripped into a region surrounded by a sealing material on one surface side of the first substrate 11, one surface of the first substrate 11 and one surface of the second substrate 12 are opposed to each other and then bonded together. Then, the sealing material is cured by applying ultraviolet rays and/or heat. Thereby, the seal member 14 and the electrolyte layer 13 sealed in the periphery are obtained.

As described above, the electro-optical apparatus 100 of the present embodiment may be manufactured. Even when the first electrode 15 is formed by providing a large number of minute concave portions on one surface of the conductive film, the same manufacturing method as described above may be used except for the steps of obtaining the first electrode 15. Regarding the steps of obtaining the first electrode 15 in question, for example, a conductive film is formed on one surface of the first substrate 11 by an appropriate film formation method such as a sputtering method, and then one surface of the conductive film is processed by blasting treatment or etching treatment to form a large number of concave portions.

Execution Example

As an execution example of the electro-optical apparatus, several samples were prepared. The layer thickness of the electrolyte layer 13 of each sample was 100 μm. For the electrolyte, GBL was used as the solvent, 350 mM of AgBr was added as an electrochromic material, 1750 mM of LiCl was added as a supporting electrolyte (supporting salt), and 30 mM of $TaCl_5$ was added as a mediator. Further, as the first electrode 15 and the second electrode 16, ITO films having a sheet resistance of 5 Ω/sq. were used respectively.

Regarding the concave-convex configuration of the surface of the first electrode 15, samples having different surface conditions, specifically, average roughness (arithmetic mean roughness) Ra were prepared by changing blasting conditions as follows. The average roughness (arithmetic mean roughness) Ra, the average length RSm, and the average depth Rc here each corresponds to those defined by JIS (Japanese Industrial Standards) standard (JIS B 0601: 2001).

Figure 5:
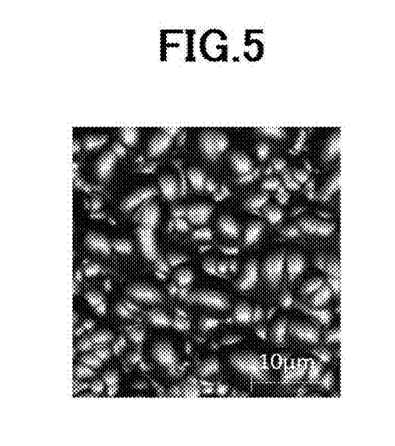
FIG. 5 is a view showing an observation image of the surface treatment state of the first electrode in the electro-optical apparatus of the execution example.

FIG. 5 is a view showing an observation image of the surface treatment state of the first electrode in the electro-optical apparatus of the execution example. In the electro-optical apparatus of this example, the surface roughness Ra of the first substrate 15 was 0.49 μm, and the diameter of each concave portion formed on the surface was approximately 3-7 μm.

Next, the viewing angle characteristics of each sample of the execution example will be described. In general, the viewing angle characteristic is evaluated by the angle dependence of the reflective brightness at each angle with respect to the reflective brightness at an angle tilted 5 degrees with respect to the normal direction of the substrate surface of the object to be measured. The range in which the image projected on the projection screen can be visually recognized is called a viewing range angle and is an angle at which the relative reflection brightness has a value of ½. When used as a display apparatus with a wide viewing angle, it is preferable that the viewing range angle is 60 degrees or more. For each sample, the reflective brightness at each angle was measured every 5 degrees in the range of 5-60 degrees.

Figure 6:
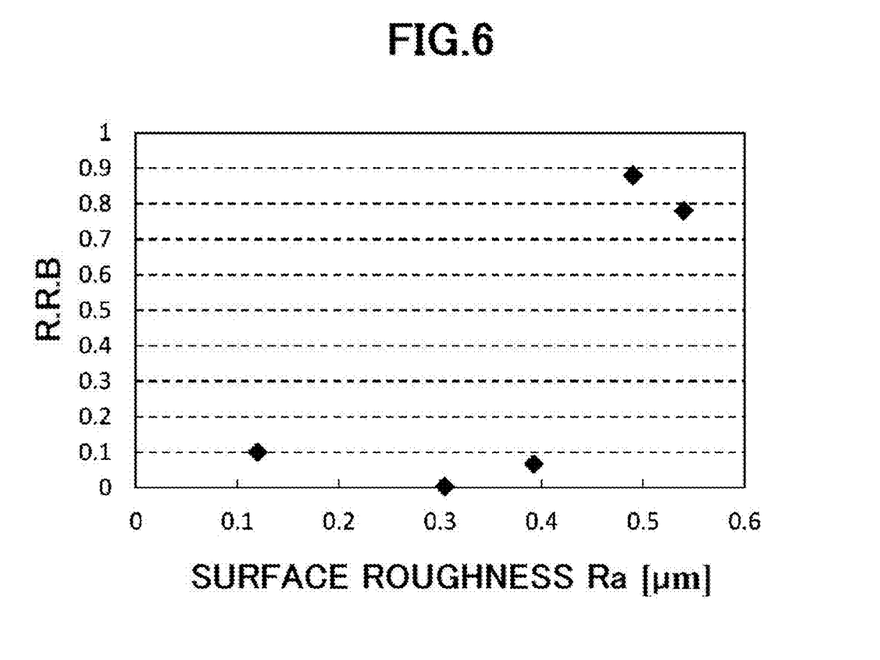
FIG. 6 is a diagram showing the relationship between the relative reflective brightness and the surface roughness of the first electrode of the electro-optical apparatus of the execution example.

FIG. 6 is a diagram showing the relationship between the relative reflective brightness (abbreviated as R.R.B in FIG. 6) and the surface roughness of the first electrode of the electro-optical apparatus of the execution example. Note that the relative reflective brightness here is obtained from the electrode with a visual field range angle of 60 degrees measured in a state where the metal film 30 is deposited on the first electrode 15. As shown in the figure, when the surface roughness Ra is larger than 0.4 μm, the relative reflective brightness tends to increase abruptly. Generally, scattering is considered to be intensified when the surface roughness Ra is equal to or greater than one half of the wavelength. However, the relative reflective brightness at 60 degrees with respect to the surface roughness Ra does not necessarily increase monotonically. This is considered to be related to the density of the surface irregularities of the electrode. Surface irregularities exist at intervals of the average length RSm, but as RSm increases with respect to Ra, it is considered that the density of the surface irregularities becomes lower and the scattering becomes less.

Figure 7:
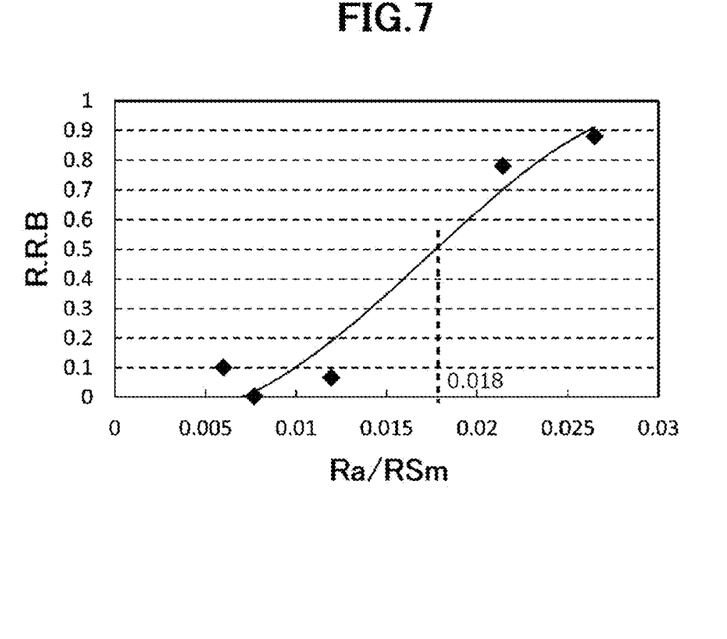
FIG. 7 is a diagram showing the relationship between relative reflective brightness and Ra/RSm (ratio of Ra and RSm) of the electro-optical apparatus of the execution example.

FIG. 7 is a diagram showing the relationship between relative reflective brightness (abbreviated as R.R.B in FIG. 7) and Ra/RSm (ratio of Ra and RSm) of the electro-optical apparatus of the execution example. As shown in the figure, the relative reflected luminance at 60 degrees increases as Ra/RSm increases. According to the approximate curve obtained based on each plot, it is understood that the value of Ra/RSm should be at least 0.018 or more in order to make the relative reflective brightness at 60 degrees equal to or more than 0.5.

Figure 8:
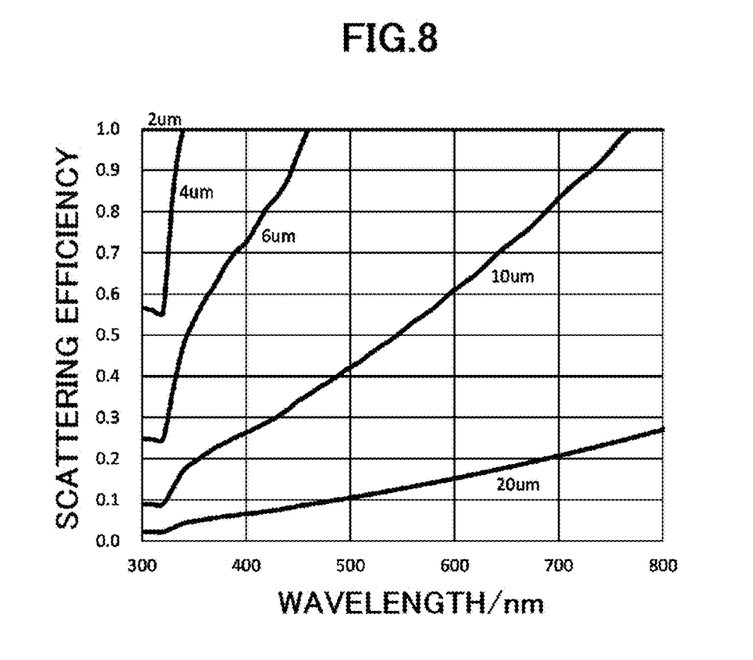
FIG. 8 is a diagram showing the relationship between the size of the surface irregularities and the scattering efficiency.

FIG. 8 is a diagram showing the relationship between the size of the surface irregularities and scattering efficiency. The scattering efficiency due to surface irregularities may differ depending on the height of the irregularities. When the surface irregularity of the electrode made of a silver film is approximated by a sphere, the scattering efficiency for one irregular portion of each size is as shown in the figure. The scattering cross-sectional area was obtained by Mie scattering theory and the scattering efficiency was obtained from the ratio of the scattering cross-sectional area and the projected cross sectional area of one irregularity. When the scattering cross-sectional area is larger than the projected cross section, the scattering efficiency is defined as 1. As can be seen from FIG. 8, when the size of the surface irregularities becomes 10 μm, the scattering efficiency becomes about 0.5 in the visible light region. That is, 50% is a regular reflection component (a specular reflection component), and it has reflection characteristics close to specular reflection. Therefore, the average depth Rc of the surface irregularities needs to be smaller than this, and it is understood that it is better to set it to 10 μm or less. Also, in general, since scattering does not occur when the size of the surface irregularities becomes ¹/₁₀ (one-tenth) or less of the wavelength of incident light, it can be considered that it is better to set the size larger than this. The average depths Rc of the samples having the viewing range angle of 60 degrees or more are 1.77 µm to 1.93 µm respectively which coincide well with the calculated sizes of the surface irregularities with high scattering efficiency.

Regarding the concave-convex configuration of the surface of the second electrode 16, by changing the film forming conditions of the conductive film 26 using the ITO nanoparticles, samples with different surface condition, specifically samples with different average roughness (arithmetic mean roughness) Ra were prepared. The average roughness (arithmetic mean roughness) Ra here also corresponds to that defined by JIS (Japanese Industrial Standards) standard (JIS B 0601:2001).

Figure 9:
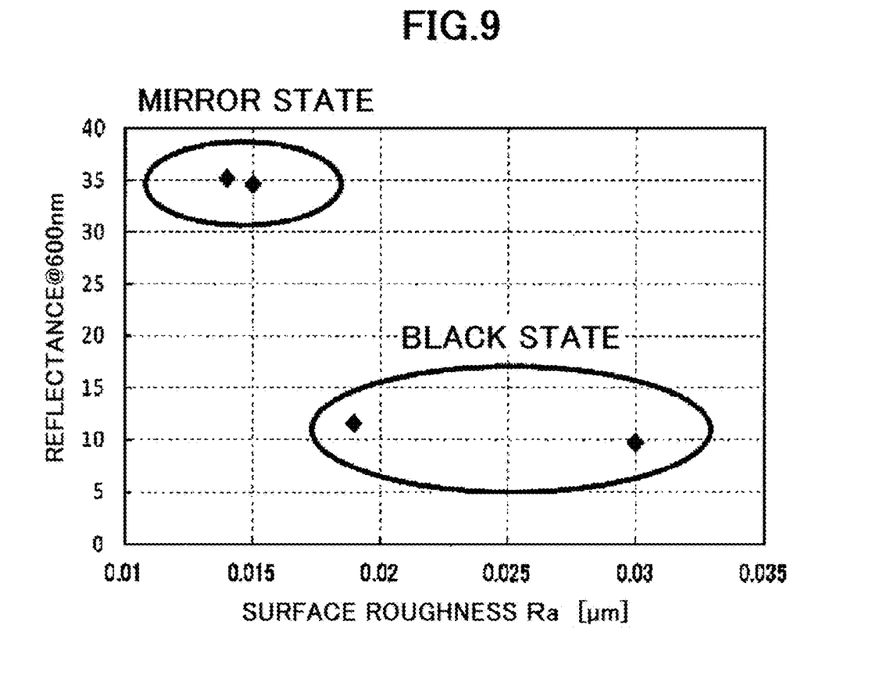
FIG. 9 is a diagram showing the relationship between the reflectance and the surface roughness of the second electrode of the electro-optical apparatus of the execution example.

FIG. 9 is a diagram showing the relationship between the reflectance and the surface roughness of the second electrode of the electro-optical apparatus of the execution example. The reflectance here is measured with the metal film 32 deposited on the second electrode 16 with the incident light wavelength being 600 nm. As shown in the figure, at least in the range where the surface roughness Ra is larger than 0.018 µm, it is understood that the reflectance is as low as around 10%. That is, it is understood that the state is suitable for a dark display (a black state). Further, when the surface roughness Ra is smaller than 0.015 µm, the reflectance increases and the second electrode 16 becomes a mirror surface state.

Second Embodiment

Figure 10:
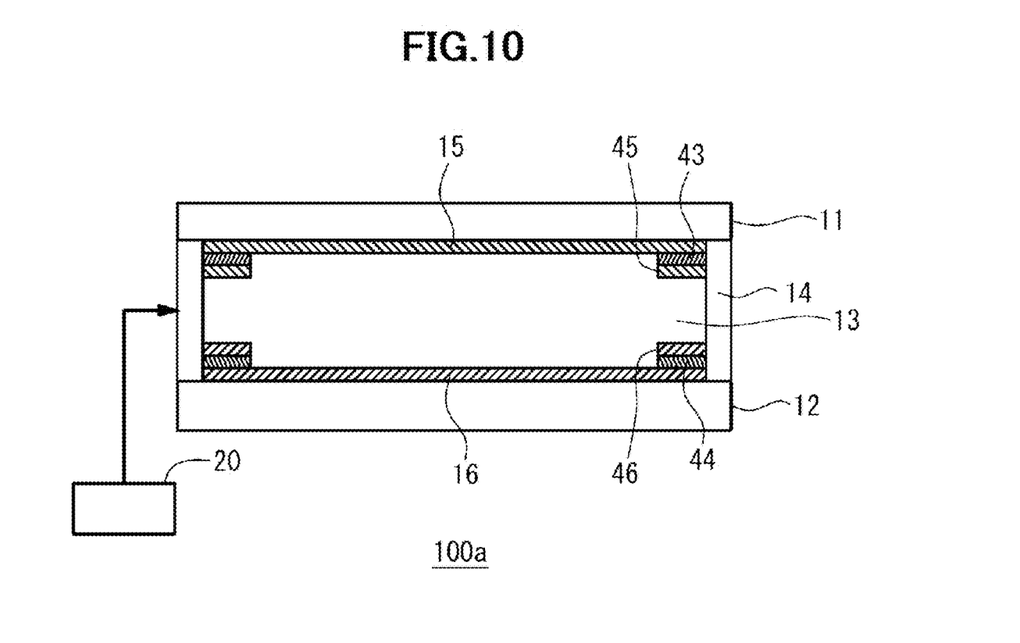
FIG. 10 is a schematic cross-sectional view showing the configuration of the electro-optical apparatus according to the second embodiment.

FIG. 10 is a schematic cross-sectional view showing the configuration of the electro-optical apparatus according to the second embodiment. The electro-optical apparatus 100a shown in FIG. 10 is different from the apparatus 100 of the first embodiment such that it includes an insulating film 43 provided on the upper surface side of the first electrode 15, a third electrode 45 provided on the upper surface side of the first electrode 15 with the insulating film 43 interposed therebetween, the insulating film 44 provided on the upper surface side of the second electrode 16, and the fourth electrode 46 provided on the upper surface side of the second electrode 16 with the insulating film 44 interposed therebetween. Other than the above, the apparatus 100a has the same configuration as the apparatus 100. Note that the same reference numerals are given to components common to the first embodiment and the second embodiment and a detailed description thereof will be omitted.

The insulating film 43 is provided on the upper surface side of the first electrode 15 and in plan view, has a looped shape (rectangular frame shape) in which the center of the first electrode 15 is opened. Similarly, the insulating film 44 is provided on the upper surface side of the second electrode 16, and in plan view, has a looped shape (rectangular frame shape) in which the center of the second electrode 16 is opened. The insulating film 43 and the insulating film 44 are provided in substantially the same shape, and are disposed so as to overlap each other in plan view. The insulating films 43 and 44 are not particularly limited as long as they are stable with respect to the electrolytic solution 13, and for example, SiO$_2$ film, Al$_2$O$_3$ film, SiN film, or the like may be used.

The third electrode 45 is provided on the upper surface side of the first electrode 15 with the insulating film 43 interposed therebetween and, in a plan view, has a substantially same shape as the insulating film 43 and also has a looped shape (rectangular frame shape) in which the center of the first electrode 15 is opened. The third electrode 45 has a surface concave-convex configuration similar to that of the first electrode 15.

The fourth electrode 46 is provided on the upper surface side of the second electrode 16 with the insulating film 44 interposed therebetween and, in a plan view, has a substantially same shape as the insulating film 44 and also has a looped shape (rectangular frame shape) in which the center of the second electrode 16 is opened. The fourth electrode 46 has a surface concave-convex configuration similar to that of the second electrode 16.

Each of the insulating films 43 and 44, the third electrode 45, and the fourth electrode 46 may be formed by the following method, for example. The manufacturing method of other components of the electro-optical apparatus 100a is the same as that of the first embodiment, and the description thereof is omitted here.

In the same manner as in the first embodiment, the first electrode 15 is formed on the first substrate 11. Next, a resist film covering the center of the first electrode 15 is formed, and while maintaining its state, an insulating film is formed by a sputtering method or the like. Next, a concave-convex configuration is formed on the surface of the insulating film by blasting treatment, wet etching treatment or the like, and a conductive film is formed on the surface having the concave-convex configuration by a sputtering method or the like. Thereafter, by removing the resist film, the insulating film and the conductive film that covered the center of the first electrode 15 are removed, and consequently, the insulating film 43 and the third electrode 45 that annularly cover the peripheral portion of the first electrode 15 are obtained.

On the other hand, in the same manner as in the first embodiment, the second electrode 16 is formed on the second substrate 12. Next, a resist film covering the center of the second electrode 16 is formed, and while maintaining its state, an insulating film is formed by a sputtering method or the like. Next, a conductive film is formed on the surface of the insulating film by a sputtering method or the like. Thereafter, by removing the resist film, the insulating film and the conductive film that covered the center of the second electrode 16 are removed, and consequently, the insulating film 44 and the conductive film that annularly cover the peripheral portion of the second electrode 16 are obtained. Then, a metal nanoparticle layer is formed on the conductive film by offset printing or the like, whereby the fourth electrode 46 is obtained.

Figure 11A:
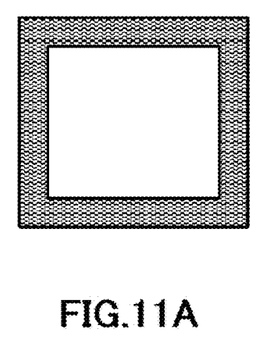
FIGS. 11A to 11C are schematic plan views for explaining the operation of the electro-optical apparatus according to the second embodiment.
Figure 11B:
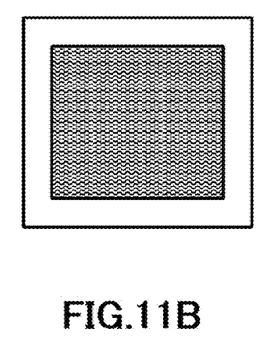
Figure 11C:
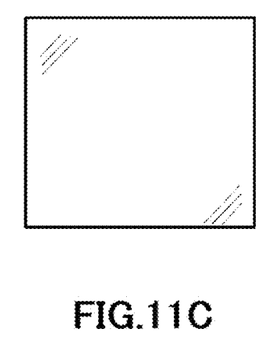

FIGS. 11A to 11C are schematic plan views for explaining the operation of the electro-optical apparatus according to the second embodiment. In the electro-optical apparatus 100a according to the second embodiment, by variably setting the potential applied to each of the first electrode 15, the second electrode 16, the third electrode 45, and the fourth electrode 46 by the driving device 20, numerous operating state may be realized.

For example, between the first electrode 15 and the second electrode 16, a voltage (2.5V, for example) is applied so that the first electrode 15 becomes a relatively low potential (cathode-side), and between the third electrode 45 and the fourth electrode 46, a voltage (2.5V, for example) is applied so that the fourth electrode 46 becomes a relatively low potential (cathode-side). As a result of this application, as shown in FIG. 11A, in the region where the first electrode 15 and the second electrode 16 overlap, since a metal film is deposited on the first electrode 15, a white state is obtained in this region, and in the region where the third electrode 45 and the fourth electrode 46 overlap, since a metal film is deposited on the fourth electrode 46, a black state is obtained in this region. That is, since the peripheral portion is in the black state and the central portion is in the white state, display in the normally black mode can be achieved.

Further, for example, between the first electrode 15 and the second electrode 16 a voltage (2.5V, for example) is applied so that the second electrode 16 becomes a relatively low potential (cathode-side), and between the third electrode 45 and the fourth electrode 46, a voltage (2.5V, for example) is applied so that the third electrode 45 becomes a relatively low electric potential (cathode-side). As a result of this application, as shown in FIG. 11B, in the region where the first electrode 15 and the second electrode 16 overlap, since a metal film is deposited on the second electrode 16, a black state is obtained in this region, and in the region where the third electrode 45 and the fourth electrode 46 overlap, since a metal film is deposited on the third electrode 45, a white state is obtained in this region. That is, since the peripheral portion is in the white state and the central portion is in the black state, display in the normally white mode can be achieved.

Further for example, when no potential difference is applied between the electrodes, as shown in FIG. 11C, a transparent state can be obtained. In addition, although not shown in the figure, when a potential difference is not generated between the third electrode 45 and the fourth electrode 46 and a potential difference is applied between the first electrode 15 and the second electrode 16, it is also possible to display such that a white state or a black state appears at the center region and the transparent state appears surrounding the center region. On the contrary, although not shown in the figure, when a potential difference is not generated between the first electrode 15 and the second electrode 16, and a potential difference is applied between the third electrode 45 and the fourth electrode 46, it is also possible to display such that a transparent state appears at the center region and the white state or a black state appears surrounding the center region.

In the above description, the first electrode 15 and the second electrode 16 are each formed in a rectangular shape for simplicity and ease of understanding, and the third electrode 45 and the fourth electrode 46 are formed in an annular shape surrounding the shapes of the respective electrodes. However, it should be noted that the shape of each electrode may be arbitrarily formed.

Third Embodiment

Figure 12:
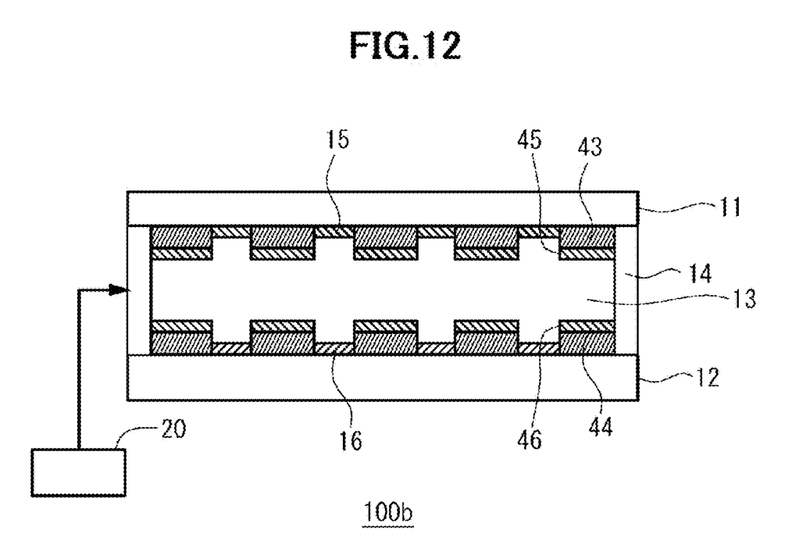
FIG. 12 is a schematic cross-sectional view showing a configuration example of an electro-optical apparatus having a plurality of segment display sections according to the third embodiment.

FIG. 12 is a schematic cross-sectional view showing a configuration example of the electro-optical apparatus according to the third embodiment. The electro-optical apparatus 100b in FIG. 12 shows a configuration example in the case where the shape of each electrode in the above-described electro-optical apparatus 100a is changed to enable a plurality of segment display sections. Note that the same reference numerals are given to components common to the second embodiment and the third embodiment, and a detailed description thereof will be omitted.

The first electrode 15 in the third embodiment has seven segment electrodes separated from each other corresponding to each display portion of seven-segment display (refer to FIGS. 13A and 13B to be described later). The configuration of each segment electrode is the same as that of the first electrode 15 of the first and second embodiments. Lead wires (not shown in the figure) are connected to the segment electrodes respectively, and are connected to the drive circuit 20 via these lead wires so that voltages can be individually applied thereto.

Similarly, the second electrode 16 in the third embodiment has seven segment electrodes separated from each other corresponding to each display portion of seven-segment display (refer to FIGS. 13A and 13B to be described later). The configuration of each segment electrode is the same as that of the second electrode 16 of the first and second embodiments. Lead wires (not shown in the figure) are connected to the segment electrodes respectively, and are connected to the drive circuit 20 via these lead wires so that voltages can be individually applied thereto.

Further, the insulating films 43 and the third electrodes 45 in the third embodiment are provided on one surface side of the first substrate 11 in a complementary manner to a region where the segment electrodes of the first electrode 15 are not provided. The insulating films 43 are provided so as to also cover the upper side of the lead wires (not shown in the figure) connected to each segment electrode of the first electrode 15. As a result, the occurrence of unnecessary display due to precipitation of the metal film on the lead wires can be prevented.

Similarly, the insulating films 44 and the fourth electrode 46 in the third embodiment are provided on one surface side of the second substrate 12 in a complementary manner to a region where the segment electrodes of the second electrode 16 are not provided. The insulating films 44 are provided so as to also cover the upper side of the lead wires (not shown in the figure) connected to each segment electrode of the second electrode 16. As a result, the occurrence of unnecessary display due to precipitation of the metal film on the lead wires can be prevented.

The first electrode 15, the second electrode 16, the insulating films 43 and 44, the third electrode 45, and the fourth electrode 46 may be formed by the following method, for example. The manufacturing method of other components of the electro-optical apparatus 100a is the same as that of the first embodiment, and the description thereof is omitted here.

First, the first electrode 15 is formed on the first substrate 11 in the same manner as in the first embodiment. Next, by patterning this first electrode 15, segment electrodes and lead wires are formed. Next, a resist film covering each segment electrode is formed. Next, an insulating film covering the resist film on the segment electrodes of the first electrode 15 and the lead wiring is formed by a sputtering method or the like. Next, a concave-convex configuration is formed on the surface of the insulating film by blasting treatment, wet etching treatment or the like, and a conductive film is formed on the concave-convex surface by a sputtering method or the like. Thereafter, by removing the resist film, the insulating film and the conductive film that covered each segment electrode of the first electrode 15 are removed, and consequently, the insulating films 43 and the third electrodes 45 covering the portions other than the respective segment electrodes of the first electrode 15 are obtained.

On the other hand, the second electrode 16 is formed on the second substrate 12 in the same manner as in the first embodiment. Next, by patterning this second electrode 16, segment electrodes and lead wires are formed. Next, a resist film covering each segment electrode is formed. Next, an insulating film covering the resist film on the segment electrodes of the second electrode 16 and the lead wiring is formed by a sputtering method or the like. Next, a conductive film is formed on the surface of the insulating film by a sputtering method or the like. Thereafter, by removing the resist film, the insulating film and the conductive film that covered each segment electrode of the second electrode 16 are removed, and consequently, the insulating films 44 and the conductive film covering the portions other than the respective segment electrodes of the second electrode 16 are obtained. Then, a metal nanoparticle layer is formed on the conductive film by offset printing or the like, whereby the fourth electrode 46 is obtained.

Figure 13A:
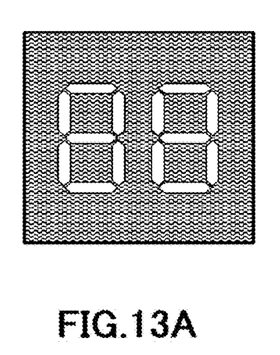
FIGS. 13A to 13C are schematic plan views for explaining the operation of the electro-optical apparatus according to the third embodiment.
Figure 13B:
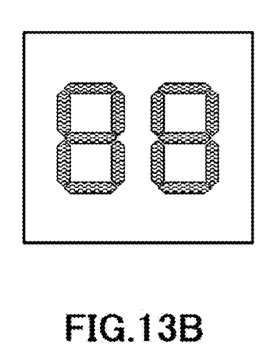
Figure 13C:
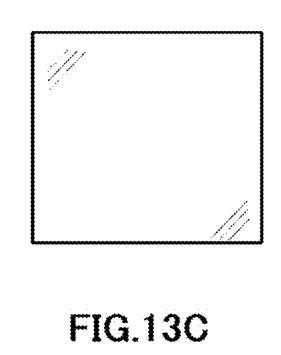

FIGS. 13A to 13C are schematic plan views for explaining the operation of the electro-optical apparatus according to the third embodiment. In the electro-optical apparatus 100*b* according to the third embodiment, by variably setting the potential applied to each of the first electrode 15, the second electrode 16, the third electrode 45, and the fourth electrode 46 by the driving device 20, numerous operating state may be realized. Specifically, FIG. 13A shows a display of a normally black mode, FIG. 13B shows a display of a normally white mode, and FIG. 13C shows a display in a transparent state. Here, the method of applying the voltage to each electrode is the same as in the case of the electro-optical apparatus 100*a* shown in FIG. 11 described above, and by applying voltages individually to each segment electrode, each segment can be individually displayed in a white state, a black state or a transparent state, whereby any alphanumeric characters may be displayed.

In the second and third embodiments, the first electrode 15 and the third electrode 45 are capable of obtaining a transparent state and a white state, while the second electrode 16 and the fourth electrode 46 are capable of obtaining a transparent state and a black state. This mode is preferable from the viewpoint of processing steps, but it is not limited thereto. For example, a mode in which the first electrode 15 and the fourth electrode 46 are capable of obtaining a transparent state and a white state while the second electrode 16 and the third electrode 45 are capable of obtaining a transparent state and in a black state may be realized. In this case, the fourth electrode 46 is obtained by forming a concave-convex configuration on the surface of the insulating film 44 by blasting treatment, wet etching treatment or the like prior to forming the fourth electrode 46, and then forming a conductive film on the concave-convex surface by sputtering or the like to form a film. And the third electrode 45 is obtained by providing a metal nanoparticle layer on the upper side of the third electrode 45 by offset printing or the like after forming the third electrode 45.

According to the electro-optical apparatus of each embodiment as described above, it is possible to freely switch between the white state, the black state and the transparent state. Therefore, by using the electro-optical apparatus of each embodiment, it is possible to obtain a display apparatus with excellent image visibility while capable of not hindering visibility by achieving a transparent state when not in use. Such an electro-optical apparatus may be suitably used as a display apparatus for applications such as digital signage and head-up display in a show window, for example.

It should be noted that this invention is not limited to the subject matter of the foregoing embodiments, and can be implemented by being variously modified within the scope of the present invention as defined by the appended claims.

For example, in the above-described embodiment, the electro-optical apparatus is designed to be viewed from the first substrate side, but it may be designed to be viewed from the second substrate side. Further, the application of the electro-optical apparatus of the present invention is not limited to display applications.

What is claimed is:

1. An electro-optical apparatus comprising:
   a first substrate having a first electrode on one surface side;
   a second substrate having a second electrode on one surface side and disposed facing the first substrate;
   an electrolyte layer including material used for electrolytic deposition and disposed between the first electrode and the second electrode;
   wherein each of the first electrode and the second electrode has irregularities on one surface side which is in contact with the electrolyte layer,
   wherein a roughness Ra of the one surface side of the first electrode is in a range of 0.4 µm to 0.8 µm,
   wherein a roughness Ra of the one surface side of the second electrode is in a range of 0.02 µm to 0.1 µm, and
   wherein the roughness Ra of the one surface side of the second electrode is approximately one order of magnitude smaller than the roughness Ra of the one surface side of the first electrode.

2. The electro-optical apparatus according to claim 1, wherein a metal film deposited from components in the electrolyte layer onto the one surface side of the first electrode has a concave-convex configuration conforming to a concave-convex configuration formed on the one surface side of the first electrode.

3. The electro-optical apparatus according to claim 1, wherein a metal film deposited from components in the electrolyte layer onto the one surface side of the second electrode has a dendrite-like configuration.

4. The electro-optical apparatus according to claim 2, wherein a metal film deposited from components in the electrolyte layer onto the one surface side of the second electrode has a dendrite-like configuration.

5. The electro-optical apparatus according to claim 1, wherein the second electrode has a metal nanoparticle layer on the one surface side.

6. The electro-optical apparatus according to claim 2, wherein the second electrode has a metal nanoparticle layer on the one surface side.

7. The electro-optical apparatus according to claim 3, wherein the second electrode has a metal nanoparticle layer on the one surface side.

8. The electro-optical apparatus according to claim 4, wherein the second electrode has a metal nanoparticle layer on the one surface side.

9. A display apparatus comprising the electro-optical apparatus according to claim 1.

10. A display apparatus comprising the electro-optical apparatus according to claim 2.

* * * * *